(12) United States Patent
Kwak et al.

(10) Patent No.: US 12,521,606 B2
(45) Date of Patent: Jan. 13, 2026

(54) APPARATUS, METHOD AND PROGRAM FOR ANALYZING GOLF SWAY

(71) Applicant: Morethings Co., Ltd., Yongin-si (KR)

(72) Inventors: Jae Kyung Kwak, Yongin-si (KR); Kwang Dek An, Hwaseong-si (KR); Ji Won Oh, Gwangju-si (KR); Hwan Il Park, Suwon-si (KR); Jeong Min Han, Seoul (KR)

(73) Assignee: Morethings Co., Ltd., Yongin-si (KR)

( * ) Notice: Subject to any disclaimer, the term of this patent is extended or adjusted under 35 U.S.C. 154(b) by 301 days.

(21) Appl. No.: 18/342,015

(22) Filed: Jun. 27, 2023

(65) Prior Publication Data

US 2025/0001254 A1 Jan. 2, 2025

(51) Int. Cl.
 A63B 69/36 (2006.01)
 A63B 24/00 (2006.01)
 A63B 71/06 (2006.01)

(52) U.S. Cl.
 CPC ...... *A63B 24/0006* (2013.01); *A63B 69/3661* (2013.01); *A63B 69/3667* (2013.01); *A63B 71/0622* (2013.01); *A63B 2220/20* (2013.01); *A63B 2220/56* (2013.01); *A63B 2220/806* (2013.01); *A63B 2220/833* (2013.01)

(58) Field of Classification Search
 CPC ............ A63B 24/0006; A63B 69/3661; A63B 69/3667; A63B 71/0622; A63B 2220/20; A63B 2220/56; A63B 2220/806; A63B 2220/833
 USPC .................. 473/266, 269, 270, 278, 409; 434/247–249, 269
 See application file for complete search history.

(56) References Cited

U.S. PATENT DOCUMENTS

| | | | | |
|---|---|---|---|---|
| 7,946,928 B2 * | 5/2011 | Mooney | ............. | A63B 69/3614 473/266 |
| 9,186,091 B2 * | 11/2015 | Mainini | ............... | A61B 5/1036 |
| 10,350,453 B2 * | 7/2019 | Niegowski | ......... | A63B 24/0021 |
| 11,458,362 B1 * | 10/2022 | Berme | ............... | G09B 19/0038 |
| 11,790,536 B1 * | 10/2023 | Berme | ..................... | G06T 7/70 382/107 |
| 2007/0196800 A1 * | 8/2007 | Douthit | ............. | A63B 69/3667 434/252 |
| 2017/0239519 A1 * | 8/2017 | Ishihara | ............... | A61B 5/7242 |
| 2020/0054248 A1 * | 2/2020 | Wu | ..................... | A61B 5/1038 |

FOREIGN PATENT DOCUMENTS

KR 10-1075303 B1 10/2011

* cited by examiner

*Primary Examiner* — Nini F Legesse
(74) *Attorney, Agent, or Firm* — Studebaker Brackett PLLC

(57) ABSTRACT

Embodiments of the inventive concept described herein relate to a golf sway analyzing apparatus, and more particularly, relate to a golf sway analyzing apparatus capable of analyzing a sway among golf postures of a user, and an analyzing method and program thereof. According to an embodiment of the inventive concept, it is possible to increase the consistency and accuracy of foot spacing calculation with low computational processing for the purpose of accurately performing sway analysis, by calculating the user's foot spacing and analyzing the user's sway based on a sensing signal of a sensor unit in which a plurality of sensors are arranged one-dimensionally or two-dimensionally on a mat plate.

9 Claims, 13 Drawing Sheets

APPARATUS, METHOD AND PROGRAM FOR ANALYZING GOLF SWAY

BACKGROUND

Embodiments of the inventive concept described herein relate to a golf sway analyzing apparatus, and more particularly, relate to a golf sway analyzing apparatus capable of analyzing a sway among golf postures of a user, and an analyzing method and program thereof.

In general, while a golf swing progresses to address, backswing, downswing, impact, and finish, a golfer maximizes coiling by rotating an upper body around his/her pelvis for coiling.

During this procedure, the golfer's upper body from the center of the pelvis to the head is not on a vertical line and moves forward, backward, left and right, and thus the axis of the body moves. Accordingly, a sway in which the trajectory of the swing is disturbed occurs.

In a procedure in which the golfer takes a posture, this sway is influenced by the stability of the posture according to an interval between left and right feet, which is influenced by the golfer's physical condition such as the golfer's height.

Accordingly, the golfer may increase the stability of a posture as long as foot spacing suitable for a height condition is suggested or as long as the foot spacing with the least amount of sway is reproduced.

To measure a distance between the golfer's feet, a conventional sway analyzing method refers to a method of estimating the golfer's skeletal information from a body image captured by a camera, extracting a skeleton, and estimating the distance between feet of the golfer based on the skeleton.

However, the conventional sway analyzing method may calculate the distance between the feet differently even in the same posture depending on the angle of the camera, and may require high computation processing performance to extract the skeleton.

Accordingly, compared to the conventional method, it is required to develop a golf sway analysis method technology that can accurately perform sway analysis by increasing the consistency and accuracy of foot spacing calculation even with low calculation processing performance.

SUMMARY

Embodiments of the inventive concept provide a golf sway analyzing apparatus that increases the consistency and accuracy of foot spacing calculation with low computational processing for the purpose of accurately performing sway analysis, by calculating the user's foot spacing and analyzing the user's sway based on a sensing signal of a sensor unit in which a plurality of sensors are arranged one-dimensionally or two-dimensionally on a mat plate, and an analyzing method and program thereof.

Problems to be solved by the inventive concept are not limited to the problems mentioned above, and other problems not mentioned will be clearly understood by those skilled in the art from the following description.

According to an embodiment, a golf sway analyzing apparatus includes a sensor unit that senses a pressure and a foot spacing of a user, a control unit that analyzes a sway of the user based on a sensing signal of the sensor unit, a display unit that displays analysis data analyzed by the control unit, and a storage unit that stores the analysis data and reference data. In the sensor unit, a plurality of pressure sensors are arranged one-dimensionally or two-dimensionally on a mat plate. The control unit determines locations of feet of the user based on the sensing signal of the sensor unit, calculates center-of-gravity and the foot spacing of the user in response to a golf swing of the user, and estimate and record an upper body reference line in the storage unit, classifies record data, which is recorded in the storage unit, for each golf swing step of the user, analyzes the sway of the user by comparing the record data classified for each golf swing stage with the reference data, and allows the display unit to display analysis data including the analyzed sway of the user.

In an embodiment, in the sensor unit, a single sensor including one of a capacitive pressure sensor, a resistive pressure sensor, and a hybrid pressure sensor, or complex sensors including at least two of the capacitive pressure sensor, the resistive pressure sensor, and the hybrid pressure sensor are arranged one-dimensionally or two-dimensionally on a mat plate.

In an embodiment, when determining the locations of the feet of the user, the control unit determines the locations of the feet of the user based on the sensing signal of the sensor unit when receiving body information of the user.

In an embodiment, when determining the locations of the feet of the user, the control unit identifies locations of a left foot and a right foot of the user from the locations of the feet of the user, identifies a heel position and a toe position of the left foot from the identified location of the left foot, and identifies a heel position and a toe position of the right foot from the identified location of the right.

In an embodiment, when calculating the center-of-gravity of the user, the control unit calculates the user's center-of-gravity by reflecting the received user's body information.

In an embodiment, when calculating the foot spacing of the user, the control unit calculates the number of sensors between the left foot and the right foot of the user, and a sensor arrangement interval based on the locations of the left foot and the right foot of the user, and calculates the foot spacing of the user based on the number of sensors and the sensor arrangement interval.

In an embodiment, when estimating the upper body reference line, the control unit estimates the upper body reference line of the user based on the center-of-gravity of the user and the received body information of the user.

In an embodiment, when displaying the analysis data, the control unit displays at least one of first analysis data obtained by comparing a recommended foot spacing suitable for a physical condition of the user with a foot spacing according to an actual swing of the user, second analysis data obtained by comparing a user preference foot spacing selected by a choice of the user with the foot spacing according to the actual swing of the user, and third analysis data obtained by comparing reference data including a center-or-pressure (COP) movement trajectory and a plantar pressure change over time with actual data including a COP movement trajectory and a plantar pressure change according to the actual swing of the user.

In an embodiment, the apparatus further includes a camera that captures a swing posture of the user. The control unit calculates a first user foot spacing in an image by extracting skeleton data corresponding to the swing posture of the user based on the image captured from the camera, calculates a second user foot spacing corresponding to the swing posture of the user based on the sensing signal of the sensor unit, corrects the first user foot spacing in the image based on the second user foot spacing, and corrects a user body length in the image based on a correction value for the first user foot spacing.

According to an embodiment, a golf sway analyzing method of a golf sway analyzing apparatus including a control unit for analyzing a sway of the user based on a sensing signal of a sensor unit includes determining, by the control unit, locations of feet of the user based on the sensing signal of the sensor unit, calculating, by the control unit, center-of-gravity and a foot spacing of the user in response to a golf swing of the user and estimating and recording an upper body reference line, classifying, by the control unit, record data corresponding to the center of gravity, the foot spacing, and the upper body reference line of the user for each golf swing step of the user, analyzing, by the control unit, a sway of the user by comparing the record data classified for each golf swing step with reference data, and displaying analysis data including the analyzed sway of the user under control of the control unit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
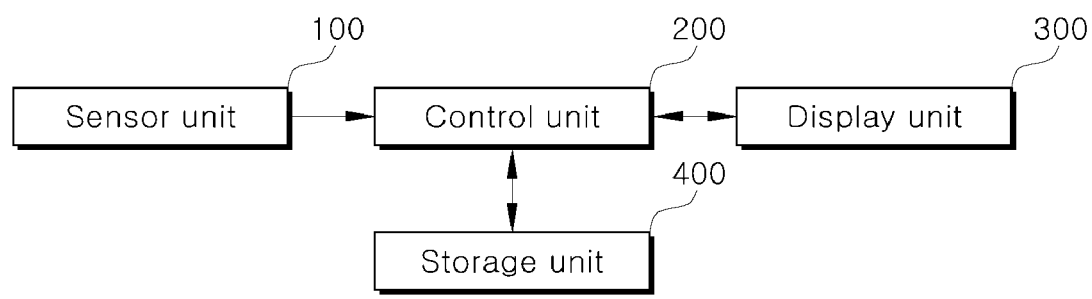
FIG. 1 is a block diagram for describing a golf sway analyzing apparatus, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

FIG. 1 is a block diagram for describing a golf sway analyzing apparatus, according to an embodiment of the inventive concept.

As illustrated in FIG. 1, a golf sway analyzing apparatus may include a sensor unit 100 that senses a pressure and a user's foot spacing, a control unit 200 that analyzes the user's sway based on the sensed signal of the sensor unit 100, a display unit 300 that displays analysis data analyzed by the control unit 200, and a storage unit 400 that stores the analysis data and reference data.

Here, in the sensor unit 100, a plurality of pressure sensors may be arranged one-dimensionally or two-dimensionally on a mat plate.

For example, each of the plurality of sensors may be a single sensor including one of a capacitive pressure sensor, a resistive pressure sensor, and a hybrid pressure sensor; alternatively, each of the plurality of sensors may be a composite sensor including two or more among the capacitive pressure sensor, the resistive pressure sensor, and the hybrid pressure sensor.

In an embodiment, in the sensor unit 100, single sensors, each of which includes one of the capacitive pressure sensor, the resistive pressure sensor, and the hybrid pressure sensor, may be arranged one-dimensionally or two-dimensionally on the mat plate.

Here, the single sensors may be arranged at equal intervals in lateral and longitudinal directions of the mat plate.

In some cases, the single sensors may be arranged at unequal intervals in the lateral direction of the mat plate and may be arranged at equal intervals in the longitudinal direction of the mat plate.

Here, the single sensors arranged in the lateral direction may be arranged such that an interval between the single sensors gradually narrows from one side of the mat plate to a center area of the mat plate and then gradually widens from the center area to the other side.

In another embodiment, in the sensor unit 100, a first sensor group including a plurality of capacitive pressure sensors and a second sensor group including a plurality of resistive pressure sensors may be arranged one-dimensionally on a mat plate. Alternatively, the first sensor group including a plurality of capacitive pressure sensors and the second sensor group including a plurality of resistive pressure sensors may be arranged two-dimensionally on the mat plate.

Here, the capacitive pressure sensors of the first sensor group are arranged at an upper portion of the mat plate to sense the trajectory of a golf club head. The resistive pressure sensors of the second sensor group are arranged at a lower portion of the mat plate to sense a pressure corresponding to the user's golf posture. In this case, the golf club according to an embodiment of the inventive concept may include at least one of a driver, a plurality of woods (e.g., 3-wood to 5-wood, or the like), a plurality of utilities (e.g., 3-utility to 5-utility, or the like), and a plurality of irons (e.g., 3-iron to 9-iron, pitching wedges, sand wedges, or the like). According to an embodiment of the inventive concept, in a golf club of which the swing speed is measured, one of the above-mentioned clubs may be set as default or the setting thereof may be changed by the user. In the following description, it is assumed that the golf club is a "driver". The inventive concept is not limited thereto, and it is obvious that the inventive concept is capable of being applied not only to the "driver" but also to all the clubs described above.

Meanwhile, the capacitive pressure sensors of the first sensor group may be arranged at equal intervals in the lateral direction and the longitudinal direction at the upper portion of the mat plate. The resistive pressure sensors of the second sensor group may be arranged at equal intervals in the lateral direction and the longitudinal direction at the lower portion of the mat plate.

Furthermore, an interval between the capacitive pressure sensors arranged in the lateral direction may be the same as an interval between the resistive pressure sensors arranged in the lateral direction. An interval between the capacitive pressure sensors arranged in the longitudinal direction may be the same as an interval between the resistive pressure sensors arranged in the longitudinal direction.

In some cases, the capacitive pressure sensors of the first sensor group may be arranged at unequal intervals in the lateral direction at the upper portion of the mat plate and may be arranged at equal intervals in the longitudinal direction at the upper portion of the mat plate. The resistive pressure sensors of the second sensor group may be arranged at equal intervals in the lateral direction and the longitudinal direction at the lower portion of the mat plate.

Here, an interval between the capacitive pressure sensors arranged in the lateral direction may be different from an interval between the resistive pressure sensors arranged in the lateral direction. An interval between the capacitive pressure sensors arranged in the longitudinal direction may be the same as an interval between the resistive pressure sensors arranged in the longitudinal direction.

For example, the capacitive pressure sensors arranged in the lateral direction may be arranged such that an interval between the capacitive pressure sensors gradually narrows from one side of the upper portion of the mat plate to a center area of the upper portion of the mat plate and then gradually widens from the center area to the other side.

Moreover, the number of capacitive pressure sensors of the first sensor group may be less than the number of resistive pressure sensors of the second sensor group.

The number of capacitive pressure sensors in the first sensor group that measures the driver's speed is not needed to be greater than the number of resistive pressure sensors in the second sensor group that measures a user's golf posture. This is to make a mat compact such that the user is capable of conveniently transporting the mat, by minimizing the size of the mat by using the smallest sensor.

In another embodiment, in the sensor unit 100, a first sensor group including a plurality of capacitive pressure sensors may be arranged one-dimensionally on a mat plate; and, a second sensor group including a plurality of resistive pressure sensors may be arranged two-dimensionally on the mat plate. Alternatively, the first sensor group including a plurality of capacitive pressure sensors may be arranged two-dimensionally on the mat plate; and, and the second sensor group including a plurality of resistive pressure sensors may be arranged one-dimensionally on the mat plate.

Here, the capacitive pressure sensors of the first sensor group are arranged at an upper portion of the mat plate to sense the trajectory of a driver head. The resistive pressure sensors of the second sensor group are arranged at a lower portion of the mat plate to sense a pressure corresponding to the user's golf posture.

Also, the capacitive pressure sensors of the first sensor group may be arranged at equal intervals in the lateral direction and the longitudinal direction at the upper portion of the mat plate. The resistive pressure sensors of the second sensor group may be arranged at equal intervals in the lateral direction and the longitudinal direction at the lower portion of the mat plate.

Here, an interval between the capacitive pressure sensors arranged in the lateral direction may be the same as an interval between the resistive pressure sensors arranged in the lateral direction. An interval between the capacitive pressure sensors arranged in the longitudinal direction may be the same as an interval between the resistive pressure sensors arranged in the longitudinal direction.

In some cases, the capacitive pressure sensors of the first sensor group may be arranged at unequal intervals in the lateral direction at the upper portion of the mat plate and may be arranged at equal intervals in the longitudinal direction at the upper portion of the mat plate. The resistive pressure sensors of the second sensor group may be arranged at equal intervals in the lateral direction and the longitudinal direction at the lower portion of the mat plate.

Here, an interval between the capacitive pressure sensors arranged in the lateral direction may be different from an interval between the resistive pressure sensors arranged in the lateral direction. An interval between the capacitive pressure sensors arranged in the longitudinal direction may be the same as an interval between the resistive pressure sensors arranged in the longitudinal direction.

At this time, the capacitive pressure sensors arranged in the lateral direction may be arranged such that an interval between the capacitive pressure sensors gradually narrows from one side of the upper portion of the mat plate to a center area of the upper portion of the mat plate and then gradually widens from the center area to the other side.

Moreover, the number of capacitive pressure sensors of the first sensor group may be less than the number of resistive pressure sensors of the second sensor group.

Besides, the capacitance of the capacitive pressure sensor of the sensor unit 100 may be changed depending on a distance from a driver and the user's pressure; the resistance of the resistive pressure sensor of the sensor unit 100 may be changed depending on the distance from the driver and the user's pressure; and, the capacitance and resistance of the hybrid pressure sensor of the sensor unit 100 may be changed depending on the distance from the driver and the user's pressure.

Next, the control unit 200 may determine locations of the feet of the user based on the sensing signal of the sensor unit 100, may calculate center-of-gravity and the foot spacing of the user in response to a golf swing of the user and may estimate and record an upper body reference line in the storage unit 400, may classify record data, which is recorded in the storage unit 400, for each golf swing step of the user, may analyze the sway of the user by comparing the record data classified for each golf swing stage with the reference data, and may allow the display unit 300 to display analysis data including the analyzed sway of the user.

Moreover, when determining the locations of the feet of the user, the control unit 200 may determine the locations of the feet of the user based on the sensing signal of the sensor unit 100 when receiving body information of the user.

Here, when determining the locations of the feet of the user, the control unit 200 may identify locations of a left foot and a right foot of the user from the locations of the feet of the user, may identify a heel position and a toe position of the left foot from the identified location of the left foot, and may identify a heel position and a toe position of the right foot from the identified location of the right.

In this case, the control unit 200 may determine that the user is ready for a swing, based on the locations of the user's feet.

Moreover, when calculating the user's center-of-gravity, the control unit 200 may calculate the center-of-gravity of the user by reflecting the received body information of the user.

When calculating the foot spacing of the user, the control unit 200 may calculate the number of sensors between the left foot and the right foot of the user, and a sensor arrangement interval based on the locations of the left foot and the right foot of the user, and may calculate the foot spacing of the user based on the number of sensors and the sensor arrangement interval.

Next, when estimating the upper body reference line, the control unit 200 may estimate the upper body reference line of the user based on the center-of-gravity of the user and the received body information of the user.

Next, when classifying record data for each golf swing step of the user, the control unit 200 may classify the record data into an address step corresponding to the user's golf swing posture, a takeaway step, a backswing top step, a transition step, a downswing step, an impact step, and a follow-through-and-finish.
This is only one example, but is not limited thereto.

Furthermore, when analyzing the user's sway, the control unit 200 may analyze the user's sway for each golf swing step by individually comparing record data classified for each golf swing step with reference data.

Next, when displaying the analysis data, the control unit 200 may display at least one of first analysis data obtained by comparing recommended foot spacing suitable for a physical condition of the user with a foot spacing according to an actual swing of the user, second analysis data obtained by comparing a user preference foot spacing selected by a choice of the user with the foot spacing according to the actual swing of the user, and third analysis data obtained by comparing reference data including a center-or-pressure (COP) movement trajectory and a plantar pressure change over time with actual data including a COP movement trajectory and a plantar pressure change according to the actual swing of the user.

Besides, the inventive concept may further include a communication unit that transmits data measured by the sensor unit 100.

Here, the communication unit may transmit data measured by the sensor unit 100 to the control unit 200 connected by wire or wirelessly.

Besides, the inventive concept may further include a camera that captures a swing posture of the user.

Here, the control unit 200 may calculate a first user foot spacing in an image by extracting skeleton data corresponding to the swing posture of the user based on the image captured from the camera, may calculate a second user foot spacing corresponding to the swing posture of the user based on the sensing signal of the sensor unit 100, may correct the first user foot spacing in the image based on the second user foot spacing, and may correct a user body length in the image based on a correction value for the first user foot spacing.

In this case, when correcting the user's body length, the control unit 200 may correct the length of each part of the user's body in the skeleton data based on the correction value for first user foot spacing.

As such, the inventive concept may increase the consistency and accuracy of foot spacing calculation with low computational processing for the purpose of accurately performing sway analysis, by calculating the user's foot spacing and analyzing the user's sway based on a sensing signal of a sensor unit in which a plurality of sensors are arranged one-dimensionally or two-dimensionally on a mat plate.

FIGS. 2 to 9 are diagrams for describing a sensor arrangement structure of a sensor unit of FIG. 1.

As shown in FIGS. 2 to 9, in a sensor unit according to an embodiment of the inventive concept, a plurality of sensors may be arranged one-dimensionally or two-dimensionally on a mat plate.

Here, each of the plurality of sensors may be a single sensor including one of a capacitive pressure sensor, a resistive pressure sensor, and a hybrid pressure sensor; alternatively, each of the plurality of sensors may be a composite sensor including two or more among the capacitive pressure sensor, the resistive pressure sensor, and the hybrid pressure sensor.

As illustrated in FIGS. 2 to 5, in the sensor unit according to an embodiment of the inventive concept, single sensors 160, each of which includes one of the capacitive pressure sensor, the resistive pressure sensor, and the hybrid pressure sensor, may be arranged one-dimensionally or two-dimensionally on a mat plate 150.

For example, the capacitance of the capacitive pressure sensor may be changed depending on a distance from a driver and the user's pressure; the resistance of the resistive pressure sensor may be changed depending on the distance from the driver and the user's pressure; and, the capacitance and resistance of the hybrid pressure sensor may be changed depending on the distance from the driver and the user's pressure.

Figure 2:
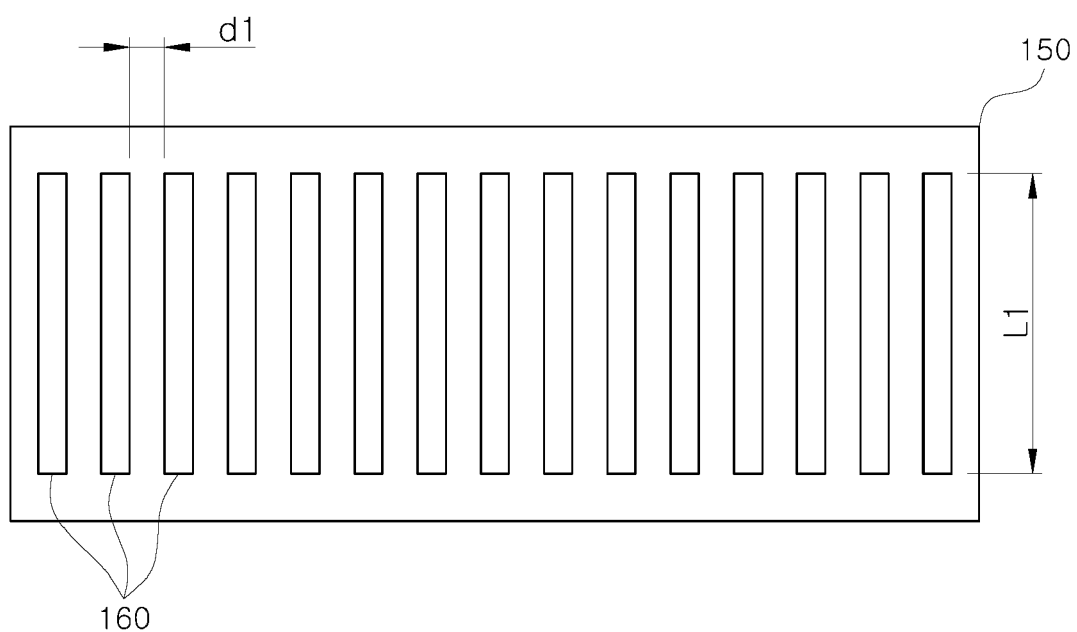
FIGS. 2 to 9 are diagrams for describing a sensor arrangement structure of a sensor unit of FIG. 1.

The single sensors 160 of FIG. 2 may be arranged one-dimensionally in a form of a bar on the mat plate 150 and may be arranged at an equal interval d1 in the lateral direction of the mat plate 150 while each of the single sensors 160 of FIG. 2 has the same length L1.

Figure 3:
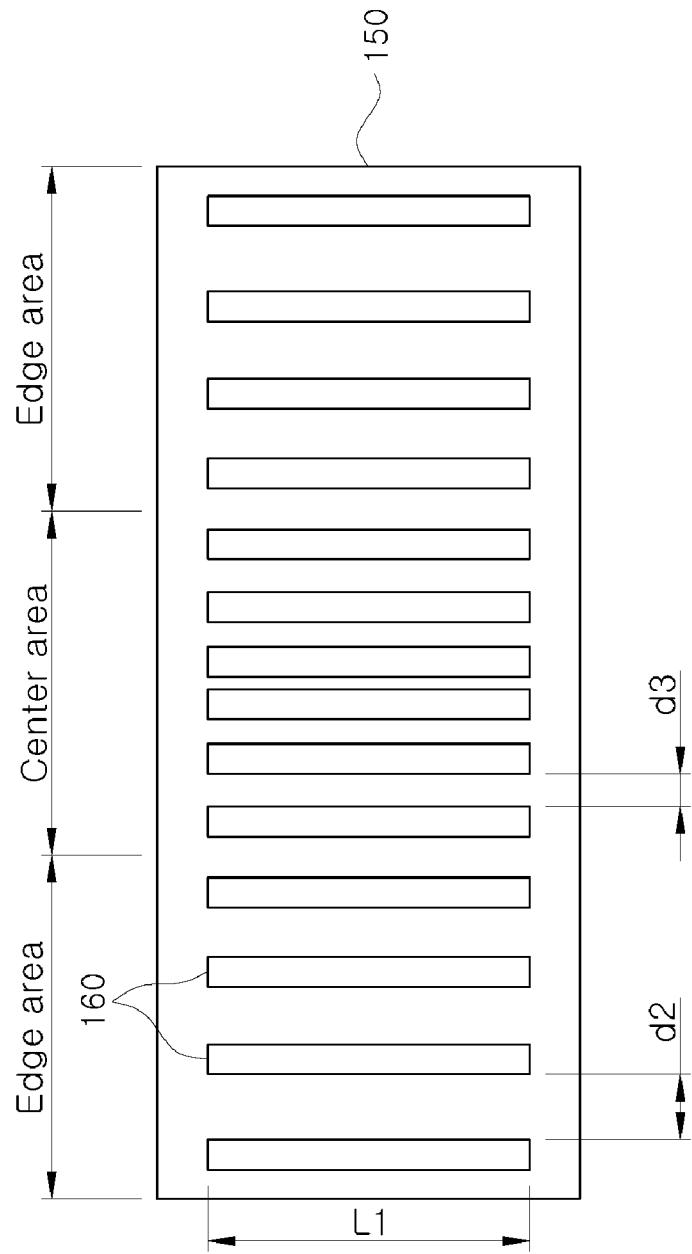

In some cases, the single sensors 160 of FIG. 3 may be arranged one-dimensionally in a form of a bar on the mat plate 150 and may be arranged at unequal intervals in the lateral direction of the mat plate 150.

Here, the single sensors 160 arranged in the lateral direction may be arranged such that an interval between the single sensors gradually narrows from one side of the mat plate to a center area of the mat plate and then gradually widens from the center area to the other side.

That is, in the single sensors 160 arranged in the lateral direction, an interval d3 between sensors located in the center area may be narrower than an interval d2 between sensors located in the edge area.

Figure 4:
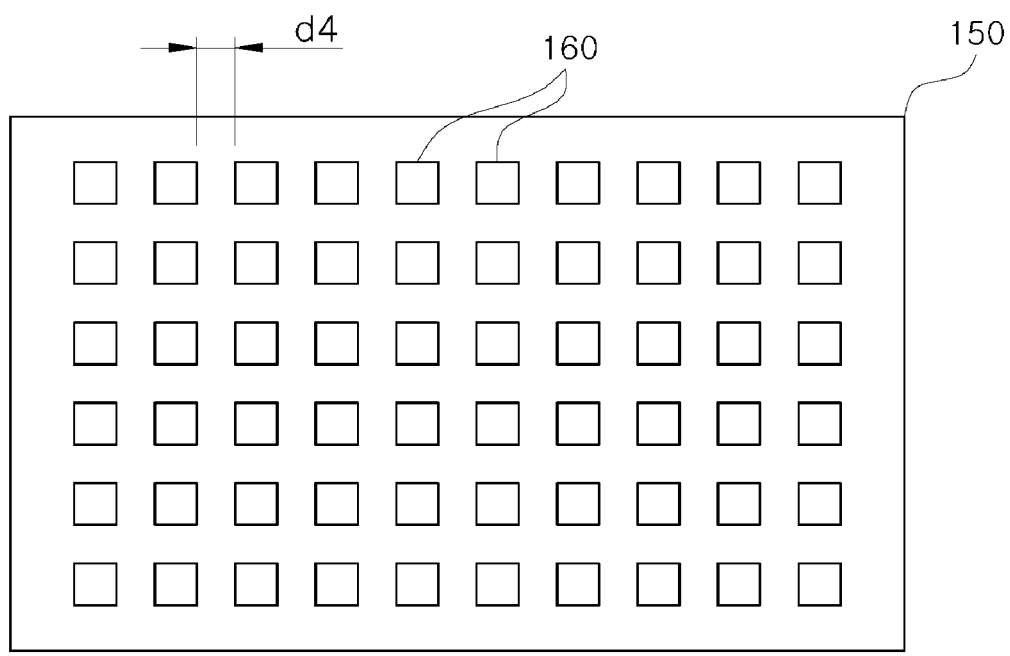

Also, the single sensors 160 of FIG. 4 may be arranged two-dimensionally in a form of a dot on the mat plate 150 and may be arranged at an equal interval d4 in lateral and longitudinal directions of the mat plate 150 while each of the single sensors 160 of FIG. 4 has the same length.

Figure 5:
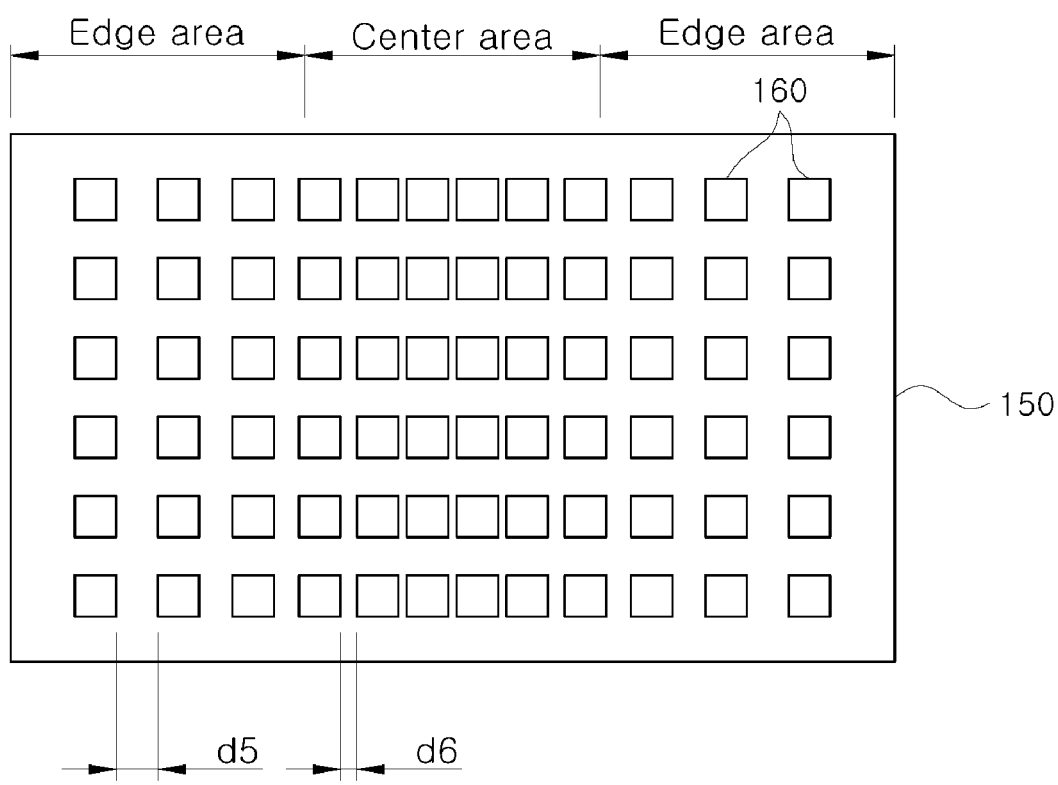

In some cases, the single sensors 160 of FIG. 5 may be arranged two-dimensionally in a form of a dot on the mat plate 150, may be arranged at unequal intervals in the lateral direction of the mat plate 150, and may be arranged at equal intervals in the longitudinal direction of the mat plate 150.

Here, the single sensors 160 arranged in the lateral direction may be arranged such that an interval between the single sensors gradually narrows from one side of the mat plate to a center area of the mat plate and then gradually widens from the center area to the other side.

That is, in the single sensors 160 arranged in the lateral direction, an interval d6 between sensors located in the center area may be narrower than an interval d5 between sensors located in the edge area.

As illustrated in FIGS. 6 to 9, in the sensor unit according to an embodiment of the inventive concept, a first sensor group 170 including a plurality of capacitive pressure sensors 172 and a second sensor group 180 including a plurality of resistive pressure sensors 182 may be arranged one-dimensionally on the mat plate 150. Alternatively, the first sensor group 170 including the plurality of capacitive pressure sensors 172 and the second sensor group 180 including the plurality of resistive pressure sensors 182 may be arranged two-dimensionally on the mat plate 150.

Here, the capacitive pressure sensors 172 of the first sensor group 170 are arranged at an upper portion of the mat plate 150 to sense the trajectory of a driver head. The resistive pressure sensors 182 of the second sensor group 180 are arranged at a lower portion of the mat plate 150 to sense a pressure corresponding to the user's golf posture.

Figure 6:
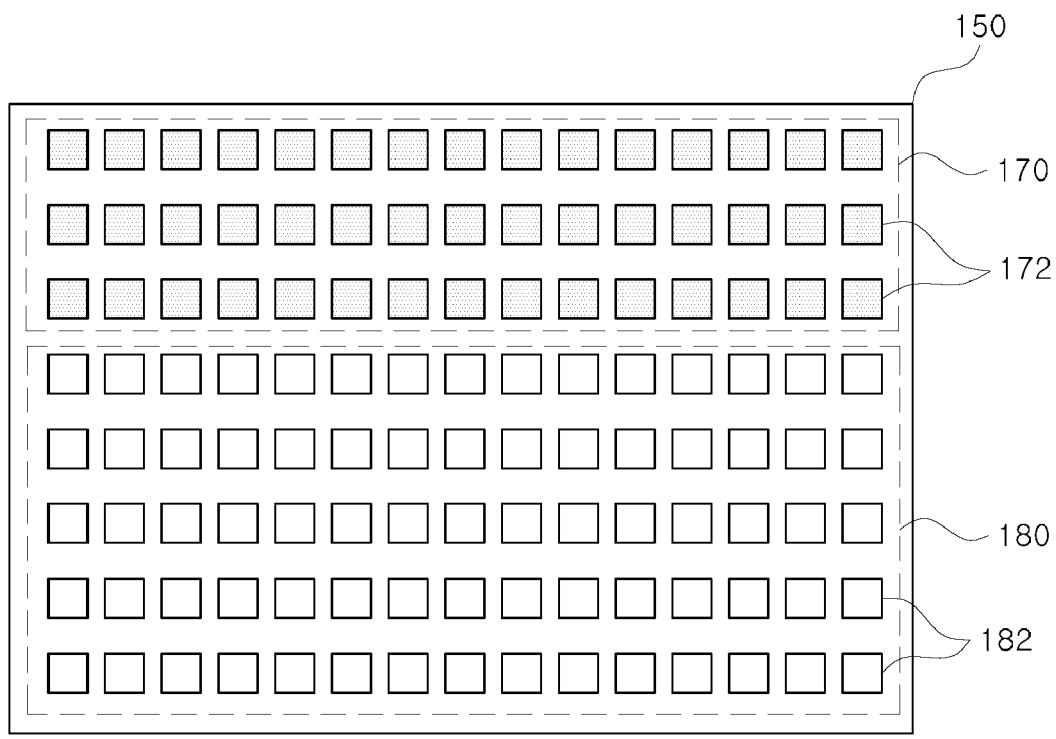

As shown in FIG. 6, the capacitive pressure sensors 172 of the first sensor group 170 may be arranged at equal intervals in the lateral direction and the longitudinal direction at the upper portion of the mat plate 150. The resistive pressure sensors 182 of the second sensor group 180 may be arranged at equal intervals in the lateral direction and the longitudinal direction at the lower portion of the mat plate 150.

Here, an interval between the capacitive pressure sensors 172 arranged in the lateral direction may be the same as an interval between the resistive pressure sensors 182 arranged in the lateral direction. An interval between the capacitive pressure sensors 172 arranged in the longitudinal direction may be the same as an interval between the resistive pressure sensors 182 arranged in the longitudinal direction.

Figure 7:
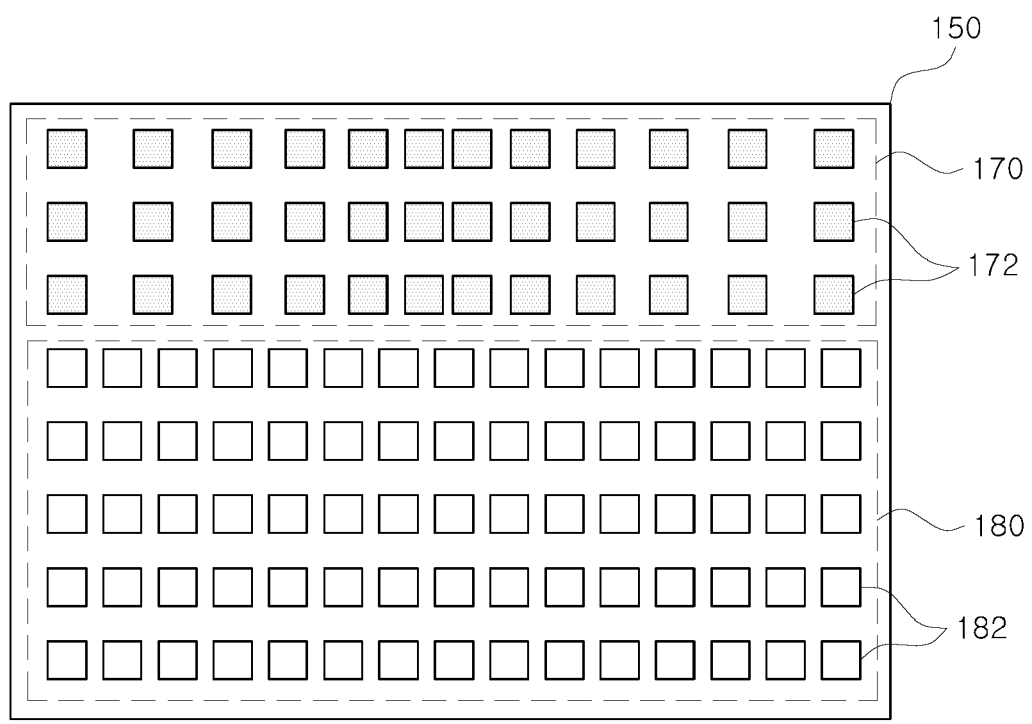

In some cases, as shown in FIG. 7, the capacitive pressure sensors 172 of the first sensor group 170 may be arranged at unequal intervals in the lateral direction at the upper portion of the mat plate 150 and may be arranged at equal intervals in the longitudinal direction at the upper portion of the mat plate 150. The resistive pressure sensors 182 of the second sensor group 180 may be arranged at equal intervals in the lateral direction and the longitudinal direction at the lower portion of the mat plate 150.

Here, an interval between the capacitive pressure sensors 172 arranged in the lateral direction may be different from an interval between the resistive pressure sensors 182 arranged in the lateral direction. An interval between the capacitive pressure sensors 172 arranged in the longitudinal direction may be the same as an interval between the resistive pressure sensors 182 arranged in the longitudinal direction.

For example, the capacitive pressure sensors 172 arranged in the lateral direction may be arranged such that an interval between the capacitive pressure sensors 172 gradually narrows from one side of the upper portion of the mat plate 150 to a center area of the upper portion of the mat plate and then gradually widens from the center area to the other side.

Moreover, the number of capacitive pressure sensors 172 of the first sensor group 170 may be less than the number of resistive pressure sensors 182 of the second sensor group 180.

The number of capacitive pressure sensors in the first sensor group that measures the driver's speed is not needed to be greater than the number of resistive pressure sensors in the second sensor group that measures a user's golf posture. This is to make a mat compact such that the user is capable of conveniently transporting the mat, by minimizing the size of the mat by using the smallest sensor.

Figure 8:
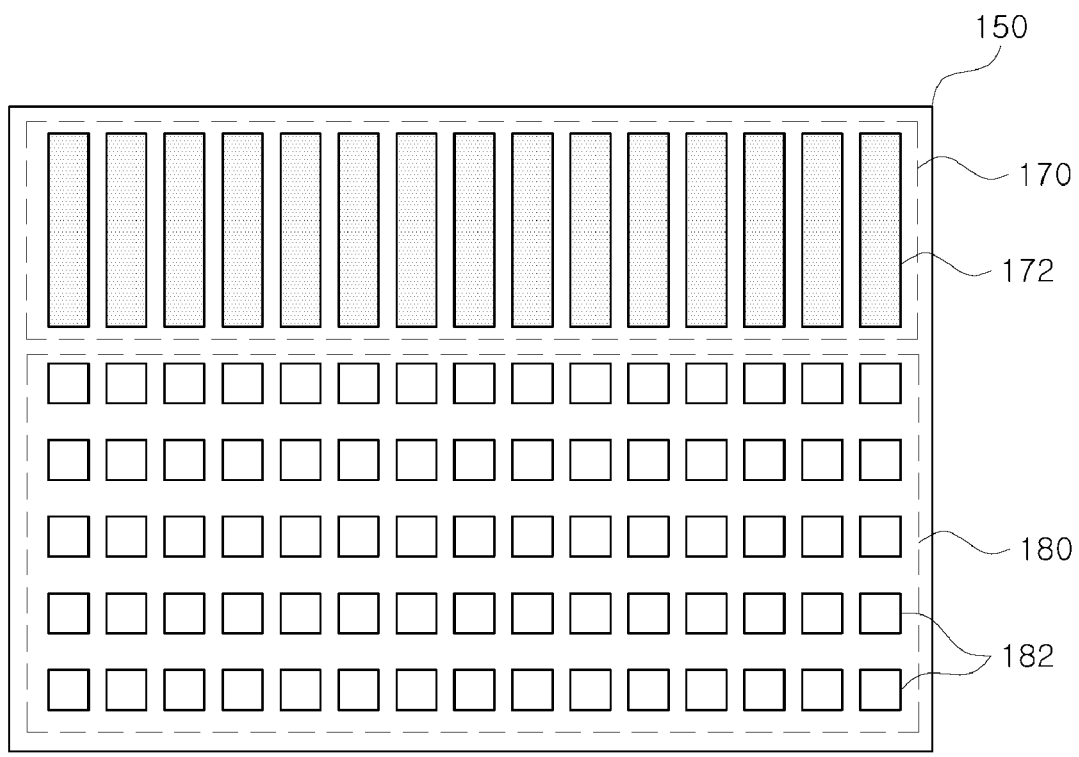
Figure 9:
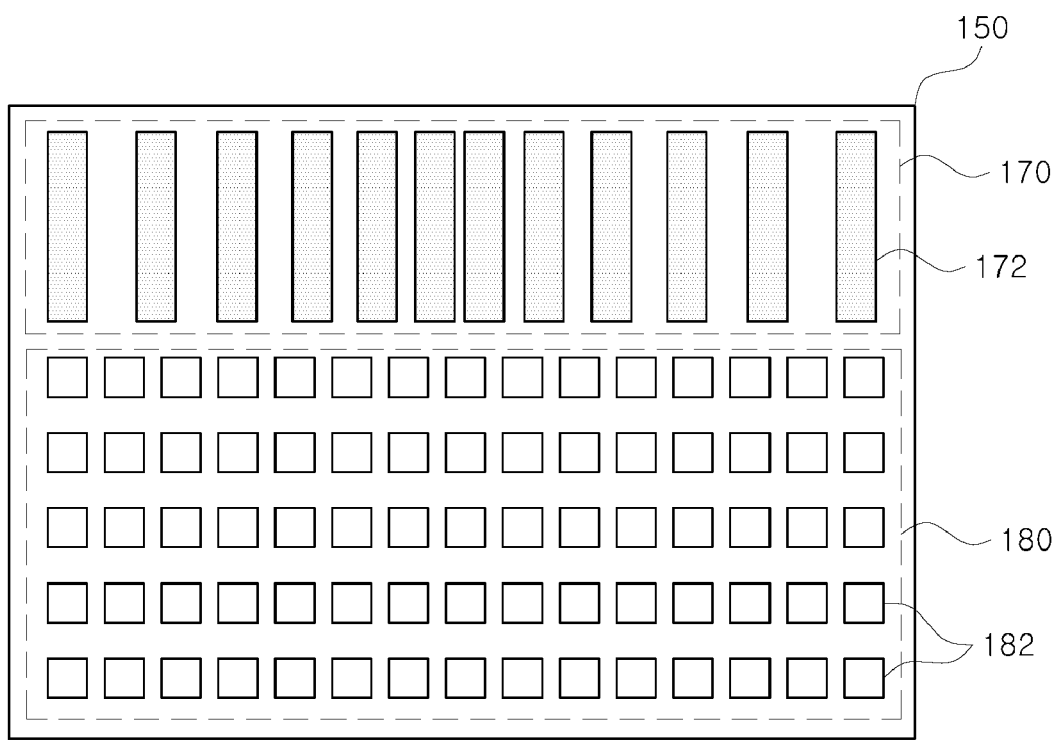

Furthermore, as illustrated in FIGS. 8 and 9, in the sensor unit, the first sensor group 170 including the plurality of capacitive pressure sensors 172 may be arranged one-dimensionally on the mat plate 150. The second sensor group 180 including the plurality of resistive pressure sensors 182 may be arranged two-dimensionally on the mat plate 150.

Here, the capacitive pressure sensors 172 of the first sensor group 170 are arranged at an upper portion of the mat plate 150 to sense the trajectory of a driver head. The resistive pressure sensors 182 of the second sensor group 180 are arranged at a lower portion of the mat plate 150 to sense a pressure corresponding to the user's golf posture.

Moreover, as shown in FIG. 8, the capacitive pressure sensors 172 of the first sensor group 170 may be arranged at equal intervals in the lateral direction at the upper portion of the mat plate 150. The resistive pressure sensors 182 of the second sensor group 180 may be arranged at equal intervals in the lateral direction and the longitudinal direction at the lower portion of the mat plate 150.

Here, an interval between the capacitive pressure sensors 172 arranged in the lateral direction may be the same as an interval between the resistive pressure sensors 182 arranged in the lateral direction.

In some cases, as shown in FIG. 9, the capacitive pressure sensors 172 of the first sensor group 170 may be arranged at unequal intervals in the lateral direction at the upper portion of the mat plate 150. The resistive pressure sensors 182 of the second sensor group 180 may be arranged at equal intervals in the lateral direction and the longitudinal direction at the lower portion of the mat plate 150.

Here, an interval between the capacitive pressure sensors 172 arranged in the lateral direction may be different from an interval between the resistive pressure sensors 182 arranged in the lateral direction.

At this time, the capacitive pressure sensors 172 arranged in the lateral direction may be arranged such that an interval between the capacitive pressure sensors 172 gradually narrows from one side of the upper portion of the mat plate 150 to a center area of the upper portion of the mat plate and then gradually widens from the center area to the other side.

Moreover, the number of capacitive pressure sensors 172 of the first sensor group 170 may be less than the number of resistive pressure sensors 182 of the second sensor group 180.

In some cases, although not illustrated, in the sensor unit, the first sensor group 170 including the plurality of capacitive pressure sensors 172 may be arranged two-dimensionally on the mat plate 150. The second sensor group 180 including the plurality of resistive pressure sensors 182 may be arranged one-dimensionally on the mat plate 150.

For example, the capacitance of the capacitive pressure sensor of the sensor unit may be changed depending on a distance from a driver and the user's pressure; the resistance of the resistive pressure sensor of the sensor unit may be changed depending on the distance from the driver and the user's pressure; and, the capacitance and resistance of the hybrid pressure sensor of the sensor unit may be changed depending on the distance from the driver and the user's pressure.

Figure 10A:
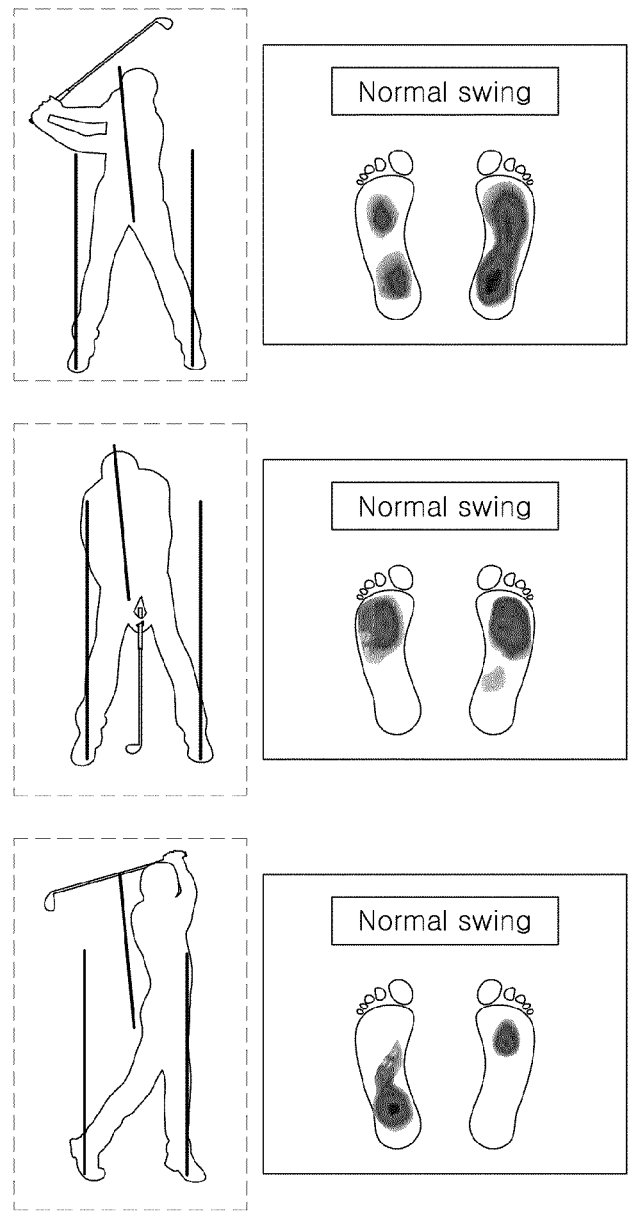
FIGS. 10A and 10B are diagram illustrating sensing results of a sensor unit according to a user's normal posture and sway posture.
Figure 10B:
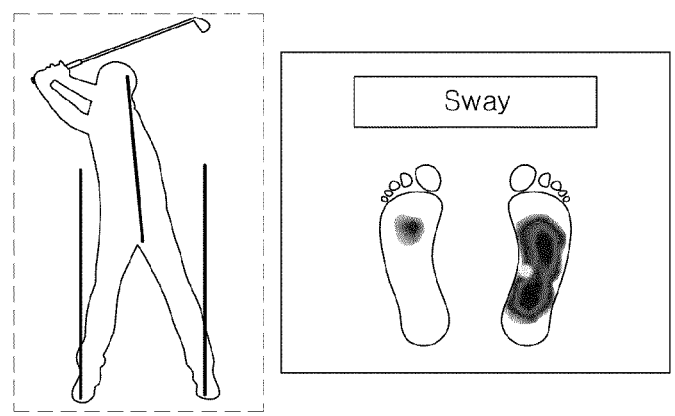
Figure 10B:
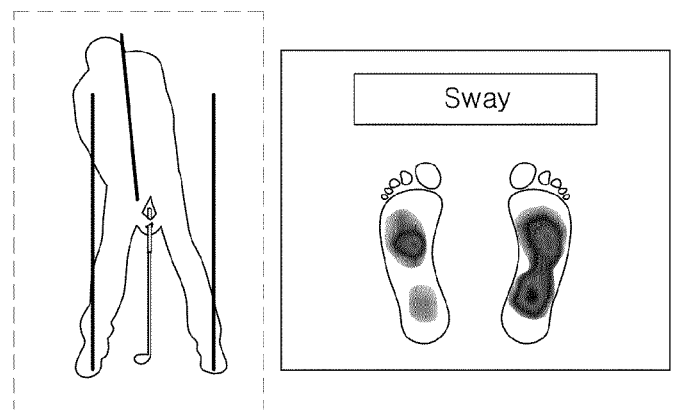
Figure 10B:
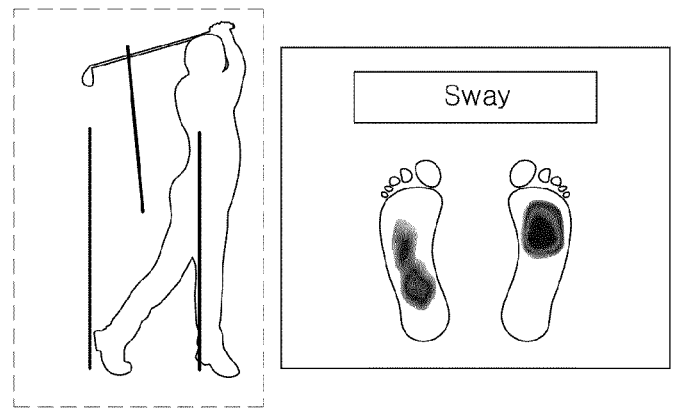

FIGS. 10A and 10B are diagram illustrating sensing results of a sensor unit according to a user's normal posture and sway posture.

As shown in FIGS. 10A and 10B, the inventive concept may determine locations of a user's feet based on the sensing signal of the sensors embedded in a mat plate, may calculate the user's center-of-gravity and foot spacing so as to correspond to the user's golf swing, may estimate a upper body reference line, may record the calculated data for each step golf swing of the user, and thus may analyze the user's sway.

As shown in FIG. 10A, when the user performs a normal swing with a normal posture, the inventive concept may measure data including locations of the user's feet and a distance between the user's feet, and the upper body reference line. As shown in FIG. 10B, when the user performs a sway swing with a sway posture, the inventive concept may measure data including locations of the user's feet and a distance between the user's feet, and the upper body reference line.

Moreover, the inventive concept may compare and analyze these pieces of data for each swing step and thus may provide the analyzed result to the user.

For example, the inventive concept may provide a user with at least one of first analysis data obtained by comparing recommended foot spacing suitable for a physical condition of the user with a foot spacing according to an actual swing of the user, second analysis data obtained by comparing a user preference foot spacing selected by a choice of the user with the foot spacing according to the actual swing of the user, and third analysis data obtained by comparing reference data including a center-or-pressure (COP) movement trajectory and a plantar pressure change over time with actual data including a COP movement trajectory and a plantar pressure change according to the actual swing of the user.

Figure 11:
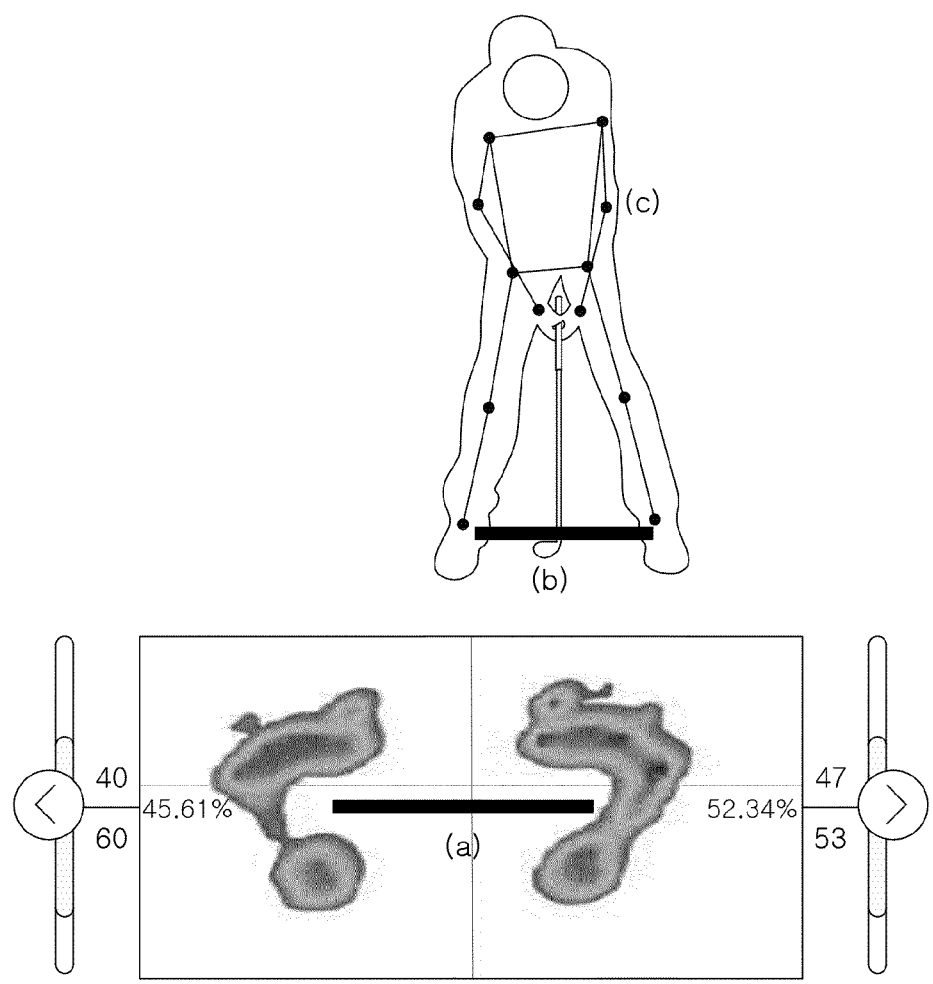
FIG. 11 is a diagram for describing a method of correcting a foot spacing of a user in an image.

FIG. 11 is a diagram for describing a method of correcting a foot spacing of a user in an image.

As illustrated in FIG. 11, the inventive concept may calculate a first user foot spacing (b) in an image by extracting skeleton data corresponding to the swing posture of the user based on the image captured from a camera, may calculate a second user foot spacing (a) corresponding to the swing posture of the user based on the sensing signal of a sensor unit, may correct the first user foot spacing (b) in the image based on the second user foot spacing (a), and may correct a user body length (c) in the image based on a correction value for the first user foot spacing (b).

Here, when correcting the user body length (c), the inventive concept may correct the length of each part of the user's body in the skeleton data based on the correction value for first user foot spacing (b).

As such, a method using the image itself and a method of searching for coordinates of feature points of people and objects in the image, extracting a skeleton, and analyzing the result may have different results depending on the location and angle of the camera.

That is, in a case of an image and a skeleton, the length is analyzed differently depending on the angle of the camera, and thus an error occurs.

Accordingly, the inventive concept may calculate the user's foot spacing based on the sensing signal of the pressure sensor by using a mat plate with a built-in pressure sensor, may determine the calculated result as an absolute value, may correct the user foot spacing in an image by using the absolute value, and may correct a length of the body such as the user's height and arm length depending on the corrected user foot spacing.

Figure 12:
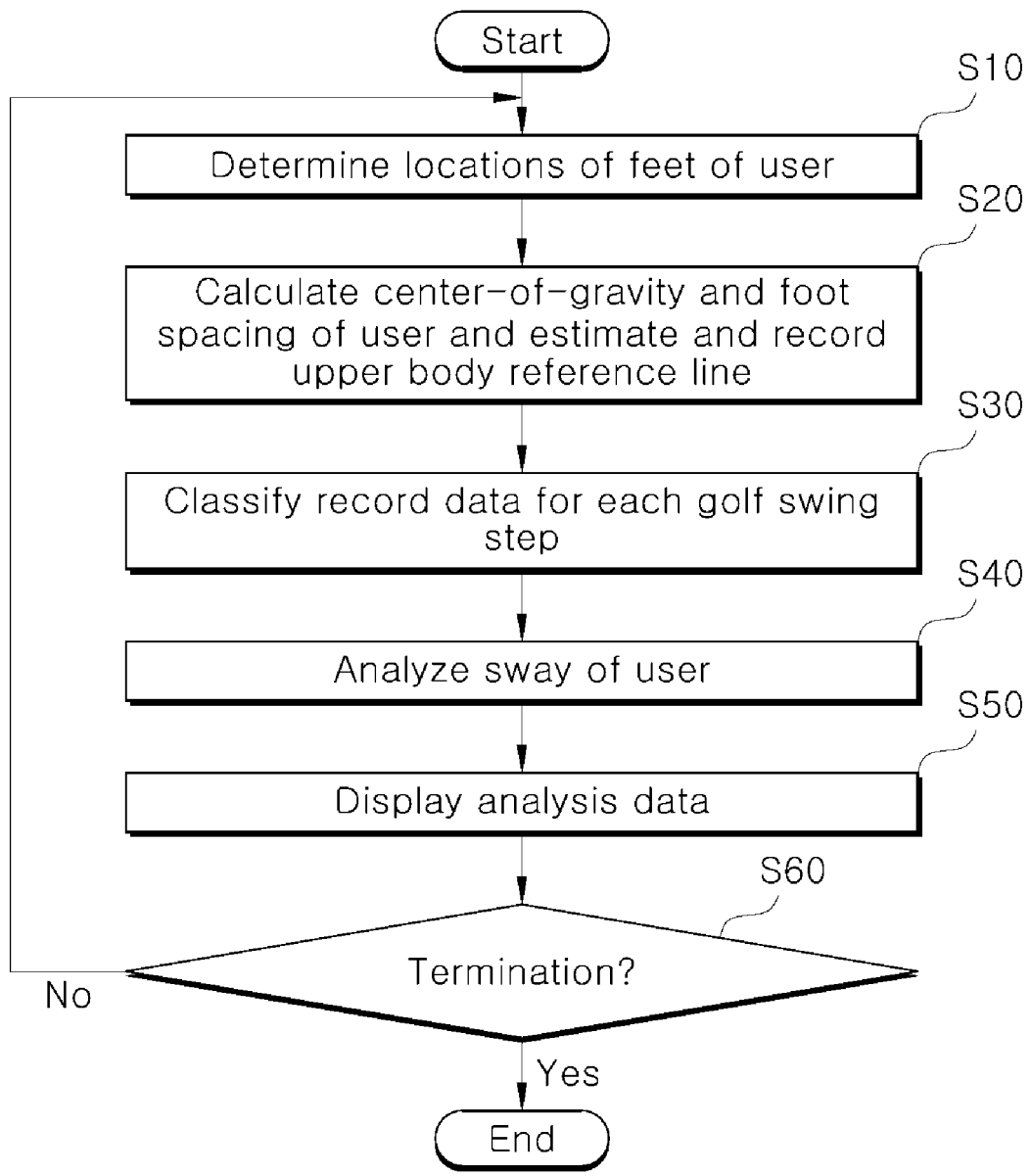
FIG. 12 is a flowchart for describing a golf sway analyzing method, according to an embodiment of the inventive concept.

FIG. 12 is a flowchart for describing a golf sway analyzing method, according to an embodiment of the inventive concept.

As shown in FIG. 12, when a user's body information is entered, the inventive concept may determine locations of feet of a user based on a sensing signal of a sensor unit (S10).

Here, when determining the locations of the feet of the user, the inventive concept may identify locations of a left foot and a right foot of the user from the locations of the feet of the user, may identify a heel position and a toe position of the left foot from the identified location of the left foot, and may identify a heel position and a toe position of the right foot from the identified location of the right.

Moreover, the inventive concept may calculate the center-of-gravity and the foot spacing of the user in response to a golf swing of the user and may estimate and record an upper body reference line (S20).

Here, the inventive concept may calculate the user's center-of-gravity by reflecting the received user's body information.

Furthermore, the inventive concept may calculate the number of sensors between the left foot and the right foot of the user, and a sensor arrangement interval based on the locations of the left foot and the right foot of the user, and may calculate the foot spacing of the user based on the number of sensors and the sensor arrangement interval.

Also, the inventive concept may estimate the upper body reference line of the user based on the center-of-gravity of the user and the received body information of the user.

Next, the inventive concept may classify record data corresponding to the center of gravity, the foot spacing, and the upper body reference line of the user for each golf swing step of the user (S30).

Next, the inventive concept may analyze the sway of the user by comparing the record data classified for each golf swing stage with the reference data (S40).

Furthermore, the inventive concept may analyze the user's sway for each golf swing step by individually comparing record data classified for each golf swing step with reference data.

In addition, the inventive concept may display analysis data including the analyzed user's sway (S50).

Here, the inventive concept may display at least one of first analysis data obtained by comparing recommended foot spacing suitable for a physical condition of the user with a foot spacing according to an actual swing of the user, second analysis data obtained by comparing a user preference foot spacing selected by a choice of the user with the foot spacing according to the actual swing of the user, and third analysis data obtained by comparing reference data including a center-or-pressure (COP) movement trajectory and a plantar pressure change over time with actual data including a COP movement trajectory and a plantar pressure change according to the actual swing of the user.

Next, the inventive concept may determine whether a sway analysis termination request is received (S60). When the sway analysis termination request is received, the inventive concept may terminate a sway analysis process.

As such, the inventive concept may increase the consistency and accuracy of foot spacing calculation with low computational processing for the purpose of accurately performing sway analysis, by calculating the user's foot spacing and analyzing the user's sway based on a sensing signal of a sensor unit in which a plurality of sensors are arranged one-dimensionally or two-dimensionally on a mat plate.

The method according to an embodiment of the inventive concept may be implemented by a program (or an application) and may be stored in a medium such that the program is executed in combination with a server being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept can be carried out in other detailed forms without changing the scope and spirit or the essential features of the inventive concept. Therefore, the embodiments described above are provided by way of example in all aspects, and should be construed not to be restrictive.

According to an embodiment of the inventive concept, it is possible to increase the consistency and accuracy of foot spacing calculation with low computational processing for the purpose of accurately performing sway analysis, by calculating the user's foot spacing and analyzing the user's sway based on a sensing signal of a sensor unit in which a plurality of sensors are arranged one-dimensionally or two-dimensionally on a mat plate.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A golf sway analyzing apparatus, the apparatus comprising:
   a sensor unit configured to sense a pressure and a foot spacing of a user;
   a control unit configured to analyze a sway of the user based on a sensing signal of the sensor unit;
   a display unit configured to display analysis data analyzed by the control unit; and
   a storage unit configured to store the analysis data and reference data,
   wherein, in the sensor unit, a plurality of pressure sensors are arranged one-dimensionally or two-dimensionally on a mat plate, and
   wherein the control unit is configured to:
   determine locations of feet of the user based on the sensing signal of the sensor unit;
   calculate center-of-gravity and the foot spacing of the user in response to a golf swing of the user, and estimate and record an upper body reference line in the storage unit;
   classify record data, which is recorded in the storage unit, for each golf swing step of the user;
   analyze the sway of the user by comparing the record data classified for each golf swing stage with the reference data; and
   allow the display unit to display analysis data including the analyzed sway of the user, and
   wherein, in the sensor unit, a single sensor including one of a capacitive pressure sensor, a resistive pressure sensor, and a hybrid pressure sensor, or complex sensors including at least two of the capacitive pressure sensor, the resistive pressure sensor, and the hybrid pressure sensor are arranged one-dimensionally or two-dimensionally on a mat plate.

2. The apparatus of claim 1, wherein the control unit is configured to:
   when determining the locations of the feet of the user, determine the locations of the feet of the user based on the sensing signal of the sensor unit when receiving body information of the user.

3. The apparatus of claim 2, wherein the control unit is configured to:
   when determining the locations of the feet of the user, identify locations of a left foot and a right foot of the user from the locations of the feet of the user;
   identify a heel position and a toe position of the left foot from the identified location of the left foot; and identify a heel position and a toe position of the right foot from the identified location of the right.

4. The apparatus of claim 1, wherein the control unit is configured to:
when calculating the foot spacing of the user,
calculate the number of sensors between a left foot and a right foot of the user, and a sensor arrangement interval based on locations of the left foot and the right foot of the user; and
calculate the foot spacing of the user based on the number of sensors and the sensor arrangement interval.

5. The apparatus of claim 1, wherein the control unit is configured to:
when estimating the upper body reference line, estimate the upper body reference line of the user based on the center-of-gravity of the user and body information of the user thus received.

6. The apparatus of claim 1, wherein the control unit is configured to:
when displaying the analysis data, display at least one of:
first analysis data obtained by comparing a recommended foot spacing suitable for a physical condition of the user with a foot spacing according to an actual swing of the user;
second analysis data obtained by comparing a user preference foot spacing selected by a choice of the user with the foot spacing according to the actual swing of the user; and
third analysis data obtained by comparing reference data including a center-or-pressure (COP) movement trajectory and a plantar pressure change over time with actual data including a COP movement trajectory and a plantar pressure change according to the actual swing of the user.

7. The apparatus of claim 1, further comprising:
a camera configured to capture a swing posture of the user,
wherein the control unit is configured to:
calculate a first user foot spacing in an image by extracting skeleton data corresponding to the swing posture of the user based on the image captured from the camera;
calculate a second user foot spacing corresponding to the swing posture of the user based on the sensing signal of the sensor unit;
correct the first user foot spacing in the image based on the second user foot spacing; and
correct a user body length in the image based on a correction value for the first user foot spacing.

8. A golf sway analyzing method of a golf sway analyzing apparatus including a control unit for analyzing a sway of a user based on a sensing signal of a sensor unit, the method comprising:
determining, by the control unit, locations of feet of the user based on the sensing signal of the sensor unit;
calculating, by the control unit, center-of-gravity and a foot spacing of the user in response to a golf swing of the user and estimating and recording an upper body reference line;
classifying, by the control unit, record data corresponding to the center of gravity, the foot spacing, and the upper body reference line of the user for each golf swing step of the user;
analyzing, by the control unit, a sway of the user by comparing the record data classified for each golf swing step with reference data; and
displaying analysis data including the analyzed sway of the user under control of the control unit, and
wherein, in the sensor unit, a single sensor including one of a capacitive pressure sensor, a resistive pressure sensor, and a hybrid pressure sensor, or complex sensors including at least two of the capacitive pressure sensor, the resistive pressure sensor, and the hybrid pressure sensor are arranged one-dimensionally or two-dimensionally on a mat plate.

9. A computer-readable recording medium storing a program for performing the golf sway analyzing method of claim 8.

* * * * *